(12) United States Patent
Jeon et al.

(10) Patent No.: US 10,489,135 B2
(45) Date of Patent: Nov. 26, 2019

(54) ELECTRONIC DEVICE AND METHOD FOR IMPROVING INSTALLATION SPEED OF THEME PACKAGE

(71) Applicant: Samsung Electronics Co., Ltd., Gyeonggi-do (KR)

(72) Inventors: Sanguk Jeon, Gyeonggi-do (KR); Youngsik Park, Gyeonggi-do (KR); Youngha Park, Gyeonggi-do (KR); Youngbum Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/365,162

(22) Filed: Nov. 30, 2016

(65) Prior Publication Data
US 2017/0161047 A1 Jun. 8, 2017

(30) Foreign Application Priority Data
Dec. 7, 2015 (KR) .......................... 10-2015-0173551

(51) Int. Cl.
*G06F 8/61* (2018.01)

(52) U.S. Cl.
CPC ...................... *G06F 8/61* (2013.01)

(58) Field of Classification Search
CPC ............... H04L 41/0803–0823; G06F 8/60–68
USPC ............................ 717/168–178; 709/220–222
See application file for complete search history.

(56) References Cited

U.S. PATENT DOCUMENTS

| | | | | |
|---|---|---|---|---|
| 6,496,979 | B1* | 12/2002 | Chen | G06F 8/61 717/178 |
| 6,976,251 | B2* | 12/2005 | Meyerson | G06F 8/65 717/173 |
| 8,341,531 | B2* | 12/2012 | Czeisler | H04L 67/34 715/739 |
| 9,086,938 | B2* | 7/2015 | Hayami | G06F 8/61 |
| 2002/0184619 | A1* | 12/2002 | Meyerson | G06F 8/65 717/173 |
| 2003/0233649 | A1* | 12/2003 | Reimert | H04L 67/34 717/176 |
| 2006/0069736 | A1* | 3/2006 | Czeisler | H04L 51/04 709/207 |
| 2006/0173911 | A1 | 8/2006 | Levin et al. | |
| 2008/0192714 | A1 | 8/2008 | Kim et al. | |
| 2010/0107153 | A1* | 4/2010 | Kwon | G06F 8/61 717/175 |

(Continued)

*Primary Examiner* — Todd Aguilera
(74) *Attorney, Agent, or Firm* — The Farrell Law Firm, P.C.

(57) ABSTRACT

An electronic device and method for improving an installation speed of a theme package are provided. The electronic device includes a display, a communication circuit, and a processor. The processor receives a file from an external device, through the communication circuit, the file including a package which contains a plurality of sub-packages, including at least one theme sub-package, the at least one theme sub-package having at least one of a resource and a function for implementing a theme to be displayed on the display, selects one of a first installation procedure and a second installation procedure to install the plurality of sub-packages in the electronic device, installs the plurality of sub-packages by using the selected installation procedure, and displays at least part of the theme on the display by using the installed plurality of sub-packages.

14 Claims, 13 Drawing Sheets

(56) References Cited

U.S. PATENT DOCUMENTS

| | | | | |
|---|---|---|---|---|
| 2013/0139183 A1* | 5/2013 | Mallur | ............ | G06F 8/63 |
| | | | | 719/321 |
| 2014/0059534 A1* | 2/2014 | Daum | ............ | G06F 8/65 |
| | | | | 717/172 |
| 2014/0298321 A1* | 10/2014 | Morino | ............ | G06F 8/61 |
| | | | | 717/175 |
| 2015/0058835 A1* | 2/2015 | Hayami | ............ | G06F 8/61 |
| | | | | 717/170 |

\* cited by examiner

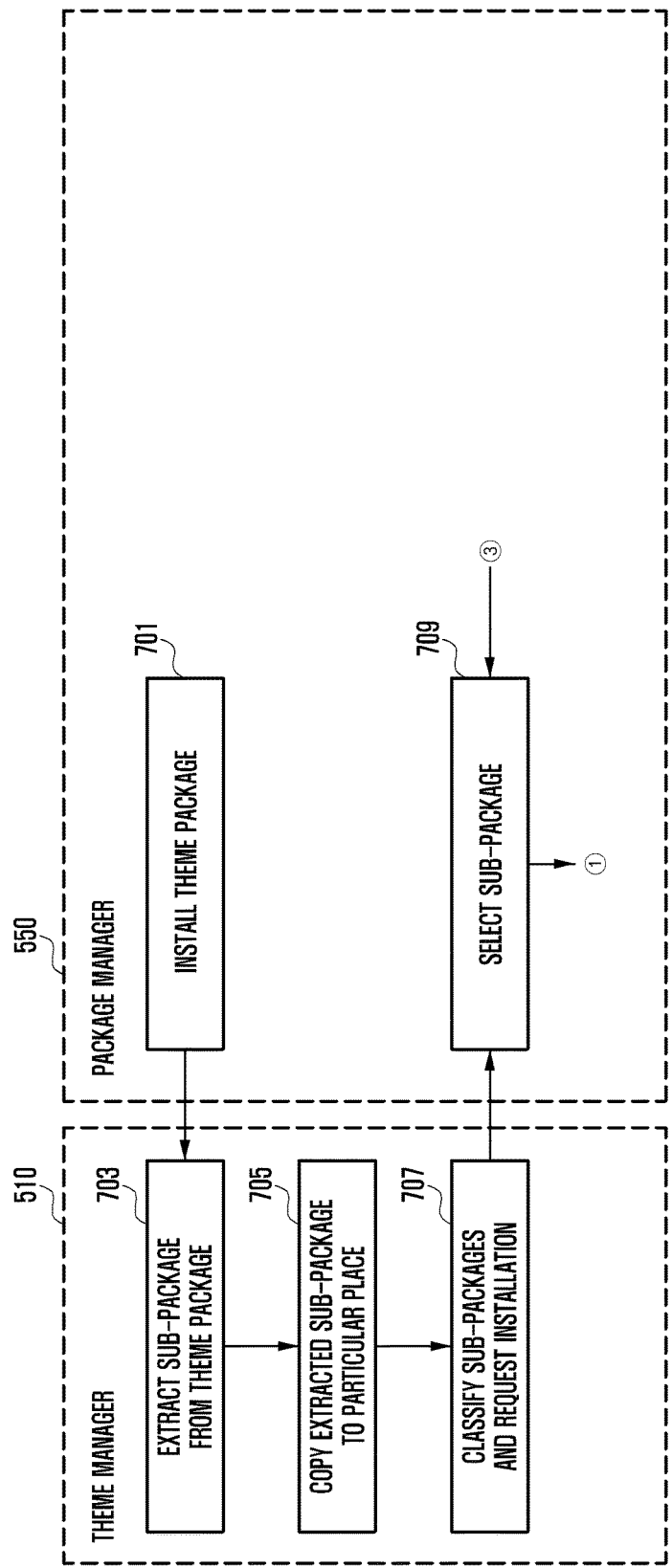

- com.sec.Pink.common.accesscontrol.apk
- com.sec.Pink.common.advsounddetector.apk
- com.sec.Pink.common.aircommand.apk  811
- com.sec.Pink.common.appicon.apk
- com.sec.Pink.common.assistantmenu.apk
- com.sec.Pink.common.backup.apk
- com.sec.Pink.common.calendar.apk
- com.sec.Pink.common.capabilitymanager.apk
- com.sec.Pink.common.cocktailbarservice.apk
- com.sec.Pink.common.common.apk
- com.sec.Pink.common.coreapps.apk
- com.sec.Pink.common.deamonapp.apk
- com.sec.Pink.common.diagmonagent.apk
- com.sec.Pink.common.dmb.apk
- com.sec.Pink.common.fotaclient.apk
- com.sec.Pink.common.galaxyfinder.apk
- com.sec.Pink.common.gallery3d.apk
- com.sec.Pink.common.hearingadjust.apk  813
- com.sec.Pink.common.home.apk
- com.sec.Pink.common.InCallUI.apk
- com.sec.Pink.common.inputmethod.apk
- com.sec.Pink.common.inputmethod_cn.apk
- com.sec.Pink.common.japan.apk  815
- com.sec.Pink.common.lock.apk
- com.sec.Pink.common.media.apk
- com.sec.Pink.common.memo.apk
- com.sec.Pink.common.mms.apk
- com.sec.Pink.common.monbiletv.apk
- com.sec.Pink.common.myfiles.apk
- com.sec.Pink.common.omcagent.apk
- com.sec.Pink.common.opencalendar.apk
- com.sec.Pink.common.peoplestripe.apk
- com.sec.Pink.common.phone.apk
- com.sec.Pink.common.policydm.apk
- com.sec.Pink.common.popupcalculator.apk
- com.sec.Pink.common.provider.apk
- com.sec.Pink.common.qconnect.apk
- com.sec.Pink.common.safetyassurance.apk
- com.sec.Pink.common.securitylogagent.apk
- com.sec.Pink.common.settings.apk
- com.sec.Pink.common.simcardmgr.apk
- com.sec.Pink.common.simsettingmgr.apk
- com.sec.Pink.common.sm.apk
- com.sec.Pink.common.SMT.apk
- com.sec.Pink.common.talkback.apk
- com.sec.Pink.common.taskmanager.apk
- com.sec.Pink.common.touchwiz.apk
- com.sec.Pink.common.universalswithch.apk  817
- com.sec.Pink.common.wallpaper.apk
- com.sec.Pink.common.weather.apk
- com.sec.Pink.common.writingbuddyservice.apk
- com.sec.Pink.common.wsomacp.apk
- com.sec.Pink.common.wssyncmldm.apk
- themes.json

ELECTRONIC DEVICE AND METHOD FOR IMPROVING INSTALLATION SPEED OF THEME PACKAGE

PRIORITY

This application claims priority under 35 U.S.C. § 119(a) to a Korean Patent Application filed on Dec. 7, 2015, in the Korean Intellectual Property Office and assigned Serial No. 10-2015-0173551, the entire disclosure of which is incorporated herein by reference.

BACKGROUND

1. Field of the Disclosure

The present disclosure relates generally to an electronic device and method for improving an installation speed of a theme package.

2. Description of the Related Art

Users' demands for unique screen designs of their electronic devices are increasing. However, the same type of smart phone generally displays the same user interfaces, such as a home screen, an application icon, a widget, a lock screen, a font, a color palette, and the like. Thus, a user who desires to express their personality can install a theme application so as to change the theme of a user interface. For example, the theme application may change each application icon displayed on a smart phone screen to a specific theme-based icon and also change a framework of a smart phone to a specific theme-based framework. Namely, based on the theme information provided at the theme application, an individual user may set up the user interface with a unique design by modifying the user interface of his or her smart phone.

A theme application is formed of a package, which may include one or more sub-packages. In general, such sub-packages may exist as many as the number of applications to which a theme will be applied (i.e., theme-applicable targets), and each sub-package may be installed to each theme-applicable target. When a single theme package (contained in the theme application) is installed in a certain electronic device, required installation processes may correspond to the number of the sub-packages included in the theme package. For example, if there are fifty sub-packages, an electronic device may perform package installation processes fifty times. Unfortunately, this may incur a considerable amount of time to install the theme package.

Additionally, while being booted, an electronic device may perform a process of checking whether packages have been normally installed. Since this process is performed with regard to each individual package on the basis of a list of installed packages, booting time will increase as the number of packages contained in the list increases.

SUMMARY

The present disclosure has been made to address at least the above-mentioned problems and/or disadvantages and to provide at least the advantages described below.

Accordingly, an aspect of the present disclosure is to apply a new simplified installation procedure (i.e., a theme installation) for theme sub-packages which removes installation operations irrelevant to the theme sub-package from all installation operations in order to reduce the time required for package installation and booting.

In accordance with an embodiment of the present disclosure, an electronic device is provided. The electronic device includes a display, a communication circuit, and a processor. The processor receives a file from an external device, through the communication circuit, the file including a package which contains a plurality of sub-packages, including at least one theme sub-package, the at least one theme sub-package having at least one of a resource and a function for implementing a theme to be displayed on the display, selects one of a first installation procedure and a second installation procedure to install the plurality of sub-packages in the electronic device, installs the plurality of sub-packages by using the selected installation procedure, and displays at least part of the theme on the display by using the installed plurality of sub-packages.

In accordance with another aspect of the present disclosure, a method for operating an electronic device is provided. The method includes receiving a file including a package which contains a plurality of sub-packages, including at least one theme sub-package, the at least one theme sub-package having at least one of a resource and a function for implementing a theme to be displayed on a screen of the electronic device, selecting one of a first installation procedure and a second installation procedure to install the plurality of sub-packages in the electronic device, installing the plurality of sub-packages by using the selected installation procedure, and displaying at least part of the theme on the screen by using the installed plurality of sub-packages.

BRIEF DESCRIPTION OF THE DRAWINGS

The above and other aspects, features, and advantages of the present disclosure will be more apparent from the following detailed description taken in conjunction with the accompanying drawings, in which:

FIGS. 7A to 7C are flow diagrams of operations performed by a theme manager and a package manager in a process of installing a theme package, according to an embodiment of the present disclosure;

FIG. 8 illustrates an example of a sub-package contained in a theme package, according to an embodiment of the present disclosure.

DETAILED DESCRIPTION OF EMBODIMENTS OF THE PRESENT DISCLOSURE

Figure 1:
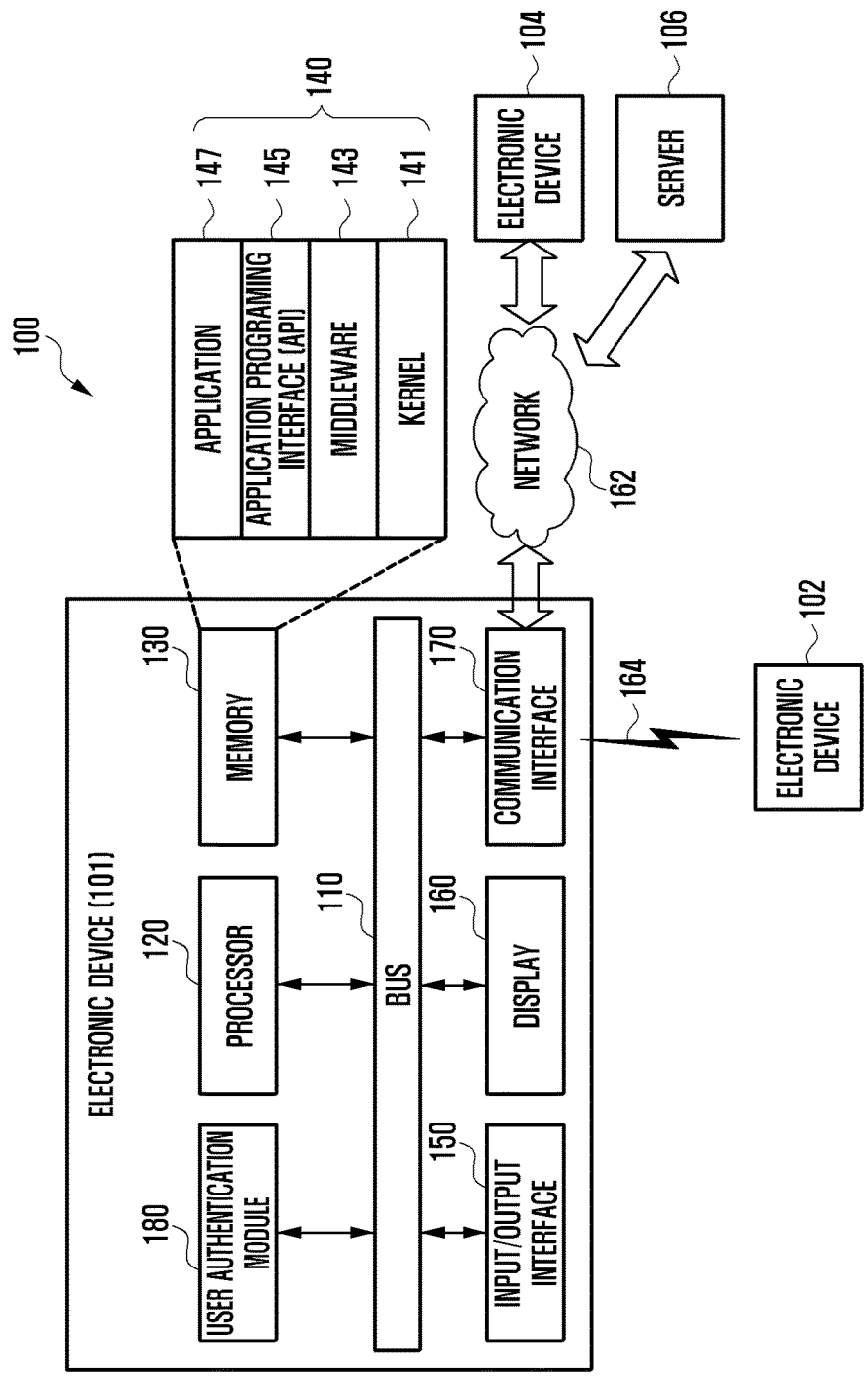
FIG. 1 is a block diagram of a configuration of a network environment including an electronic device, according to an embodiment of the present disclosure.

Hereinafter, the present disclosure is described with reference to the accompanying drawings. Although specific embodiments are illustrated in the drawings and related detailed descriptions are disclosed herein, the present disclosure may have various modifications and several embodiments. However, various embodiments of the present disclosure are not limited to a specific implementation form and it should be understood that the present disclosure includes all changes and/or equivalents and substitutes included in the spirit and scope of the present disclosure. In connection with descriptions of the drawings, similar components are designated by the same reference numeral.

As used herein, the terms "include", "have", "may include" or "may have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

As used herein, the expression "or" or "at least one of A or/and B" includes any or all of combinations of words listed together. For example, the expression "A or B" or "at least A or/and B" may include A, may include B, or may include both A and B.

The expressions "1", "2", "first", and "second" used herein may modify various components of the various embodiments but do not limit the corresponding components. For example, the above expressions do not limit the sequence and/or importance of the components. The expressions may be used for distinguishing one component from other components. For example, a first user device and a second user device indicate different user devices although both of them are user devices. For example, a first structural element may be referred to as a second structural element without departing from the scope of the present disclosure. Similarly, the second structural element also may be referred to as the first structural element.

When a component (i.e., a first component) is (operatively or communicatively) "coupled to" or "connected to" another component (i.e., a second component), the component may be directly coupled or connected to the other component or a new component (i.e., a third component) may exist between the two components. In contrast, when a component (i.e., a first component) is "directly coupled to" or "directly connected to" another component (i.e., a second component), a new component (i.e., a third component) does not exist between the first component and the second component.

The expression "configured (or set) to do" may be interchangeably used with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a generic-purpose processor. (e.g., a central processing unit (CPU) or an application processor) that may execute one or more software programs stored in a memory device to perform corresponding functions.

An electronic device according to various embodiments of the present disclosure may be a device including an antenna. For example, the electronic device may be a smart phone, a tablet personal computer (PC), a mobile phone, a video phone, an e-book reader, a desktop PC, a laptop PC, a netbook computer, a personal digital assistant (PDA), portable multimedia player (PMP), MP3 player, a mobile medical application, a camera, and a wearable device (for example, a head-mounted-device (HMD), such as electronic glasses, electronic clothes, an electronic bracelet, an electronic necklace, an electronic appcessary, an electronic tattoo, and a smart watch).

The electronic device may also be a smart home appliance having an antenna, such as a television (TV), a digital versatile disk (DVD) player, an audio player, an air conditioner, a cleaner, an oven, a microwave oven, a washing machine, an air purifier, a set-top box, a TV box (for example, Samsung HomeSync™, Apple TV™, or Google TV™), game consoles, an electronic dictionary, an electronic key, a camcorder, and an electronic frame.

The electronic device may also be a type of medical device (for example, a magnetic resonance angiography (MRA) device, a magnetic resonance imaging (MRI) device, a computed tomography (CT) device, a scanner, an ultrasonic device and the like), a navigation device, a global positioning system (GPS) receiver, an event data recorder (EDR), a flight data recorder (FDR), a vehicle infotainment device, electronic equipment for a ship (for example, a navigation device for a ship, a gyro compass and the like), an avionics device, a security device, a head unit for a vehicle, an industrial or home robot, an automatic teller machine (ATM), a point of sale (POS) device, and an Internet of Things (IoT) device.

The electronic device may also be furniture or a part of a building/structure, an electronic board, an electronic signature receiving device, a projector, and various types of measuring devices (for example, a water meter, an electricity meter, a gas meter, a radio wave meter and the like), which are equipped with an antenna.

Further, the electronic device may be a flexible device.

The electronic device may also be a combination of the devices listed above. It should be apparent to those skilled in the art that the electronic device according to various embodiments of the present disclosure is not limited to the above described devices.

Herein, the term "user" may indicate a person who uses an electronic device or a device (e.g., an artificial intelligence electronic device) using an electronic device.

Herein, the term "theme application" refers to a particular application associated with the theme of an electronic device. The theme application may contain at least one theme package, each of which may include at least one sub-package. The theme package may include sub-packages corresponding to target applications to which a theme is applied. The sub-packages included in the theme package may be classified into normal sub-packages and theme sub-packages. The normal sub-package may be installed through a general package installation process (hereinafter, referred to as "normal installation"). An installation process of performing installation operations only associated with the theme sub-package may be separated from general package installation operations. Hereinafter, an installation process associated with the theme sub-package is referred to as "theme installation". The theme sub-package may be installed through the "theme installation".

A "theme installation" may indicate a particular process which is obtained by removing installation processes irrelevant to the theme sub-package from installation processes of a "normal installation" and is therefore formed of installation operations only associated with the theme sub-package. A "theme installation" may be predetermined and also applied to any sub-package corresponding to the theme sub-package.

FIG. 1 is a block diagram of a configuration of a network environment including an electronic device, according to an embodiment of the present disclosure.

Referring to FIG. 1, a network environment 100, including an electronic device 101, is provided. The electronic device 101 may include a bus 110, a processor 120, a memory 130, an input/output interface 150, a display 160, a communication interface 170, and a user authentication module 180. At least one of the above described components may be omitted from the electronic device 101 or another component may be further included in the electronic device 101.

The bus 110 may be a circuit connecting the above described components 120, 130, and 150-170 and transmitting communications (e.g., control messages and/or data) between the above described components.

The processor 120 includes one or more of the following: a central processing unit (CPU), an application processor (AP), and a communication processor (CP). The processor 120 controls at least one of other components of the electronic device 101 and/or processing data or operations related to communication.

The memory 130 includes volatile memory and/or nonvolatile memory. The memory 130 stores data or commands related to at least one of other components of the electronic device 101. The memory 130 stores software and/or a program module 140.

The program module 140 includes a kernel 141, middleware 143, application programming interface (API) 145, and an application 147. The kernel 141, middleware 143 or at least part of the API 145 may be called an operating system (OS).

The kernel 141 controls or manages system resources (e.g., the bus 110, processor 120, memory 130, etc.) used to execute operations or functions of other programs (e.g., the middleware 143, API 145, and application 147). The kernel 141 provides an interface capable of allowing the middleware 143, API 145, and application 147 to access and control/manage the individual components of the electronic device 101.

The middleware 143 mediates between the API 145 or application 147 and the kernel 141 so that the API 145 or the application 147 can communicate with the kernel 141 and exchange data therewith. The middleware 143 processes one or more task requests received from the application 147 according to the priority. For example, the middleware 143 is assigns a priority for use of system resources of the electronic device 101 (e.g., the bus 110, processor 120, memory 130, etc.) to at least one of the application 147. For example, the middleware 143 processes one or more task requests according to a priority assigned to at least one application program, thereby performing scheduling or load balancing for the task requests.

The API 145 refers to an interface configured to allow the application 147 to control functions provided by the kernel 141 or the middleware 143. The API 145 includes at least one interface or function (e.g., instructions) for file control, window control, image process, text control, or the like.

The input/output interface 150 transfers instructions or data, received from the user or external devices, to one or more components of the electronic device 101. The input/output interface 150 outputs instructions or data, received from one or more components of the electronic device 101, to the user or external devices.

The display 160 includes a liquid crystal display (LCD), a flexible display, a transparent display, a light emitting diode (LED) display, an organic light emitting diode (OLED) display, micro-electro-mechanical systems (MEMS) display, an electronic paper display, etc. The display 160 displays various types of content (e.g., texts, images, videos, icons, symbols, etc.). The display 160 may also be implemented with a touch screen. In this case, the display 160 receives touches, gestures, proximity inputs or hovering inputs, via a stylus pen, or a user's body.

The communication interface 170 establishes communication between the electronic device 101 and an external device (e.g., a first external device 102, a second electronic device 104, or a server 106). For example, the communication interface 170 communicates with the first external electronic device 102 via short-range communication 164 and communicates with the second external device 104 or the server 106 connected to the network 162 via wired or wireless communication.

Wireless communication may employ, as cellular communication protocol, at least one of the following: long-term evolution (LTE), LTE advance (LTE-A), code division multiple access (CDMA), wideband CDMA (WCDMA), universal mobile telecommunications system (UMTS), wireless broadband (WiBro), and global system for mobile communication (GSM). Wireless communication may also include the short-wireless communication 164. Short-wireless communication 164 may include at least one of the following: WiFi, Bluetooth (BT), near field communication (NFC), magnetic secure transmission (MST), and global navigation satellite system (GNSS). The GNSS may include at least one of the following: global positioning system (GPS), global navigation satellite system (Glonass), Beidou navigation satellite system (Beidou, Galileo, the European global satellite-based navigation system, according to GNSS using areas, bandwidths, etc. In the present disclosure, the terms "GPS" and "GNSS" may be used interchangeably. Wired communication may include at least one of the following: universal serial bus (USB), high definition multimedia interface (HDMI), recommended standard 232 (RS-232), and plain old telephone service (POTS). The network 162 may include at least one of the following: a telecommunications network, e.g., a computer network (e.g., LAN or WAN), the Internet, and a telephone network.

The user authentication module 180 may obtain, e.g., user authentication information from a user. The user authentication information may include various kinds of personal authentication information such as face recognition authentication information, touch pattern authentication information, biometric authentication information (e.g., fingerprint, iris, vein, etc.). The user authentication module 180 may determine whether a user is a rightful user or not, by comparing authentication information received from the user with that stored already in the memory 130.

The first and second external electronic devices 102 and 104 may each be identical to or different from the electronic device 101, in terms of type. The server 106 includes a group of one or more servers. Part or all of the operations executed on the electronic device 101 may be executed on another electronic device or a plurality of other electronic devices (e.g., electronic devices 102 and 104 or a server 106). In this case, when the electronic device 101 needs to perform a function or service automatically or according to a request, it does not perform the function or service, but is capable of additionally requesting at least part of the function related to the function or service from an external electronic device (e.g., the external electronic devices 102 and 104 or a server 106). The external electronic device (e.g., the external electronic devices 102 and 104 or a server 106) is capable of executing the requested function or additional functions, and transmitting the result to the electronic device 101. The electronic device 101 processes the received result, or further proceeds with additional processes, to provide the requested function or service. To this end, the electronic device 101 may employ cloud computing, distributed computing, or client-server computing technology.

Figure 2:
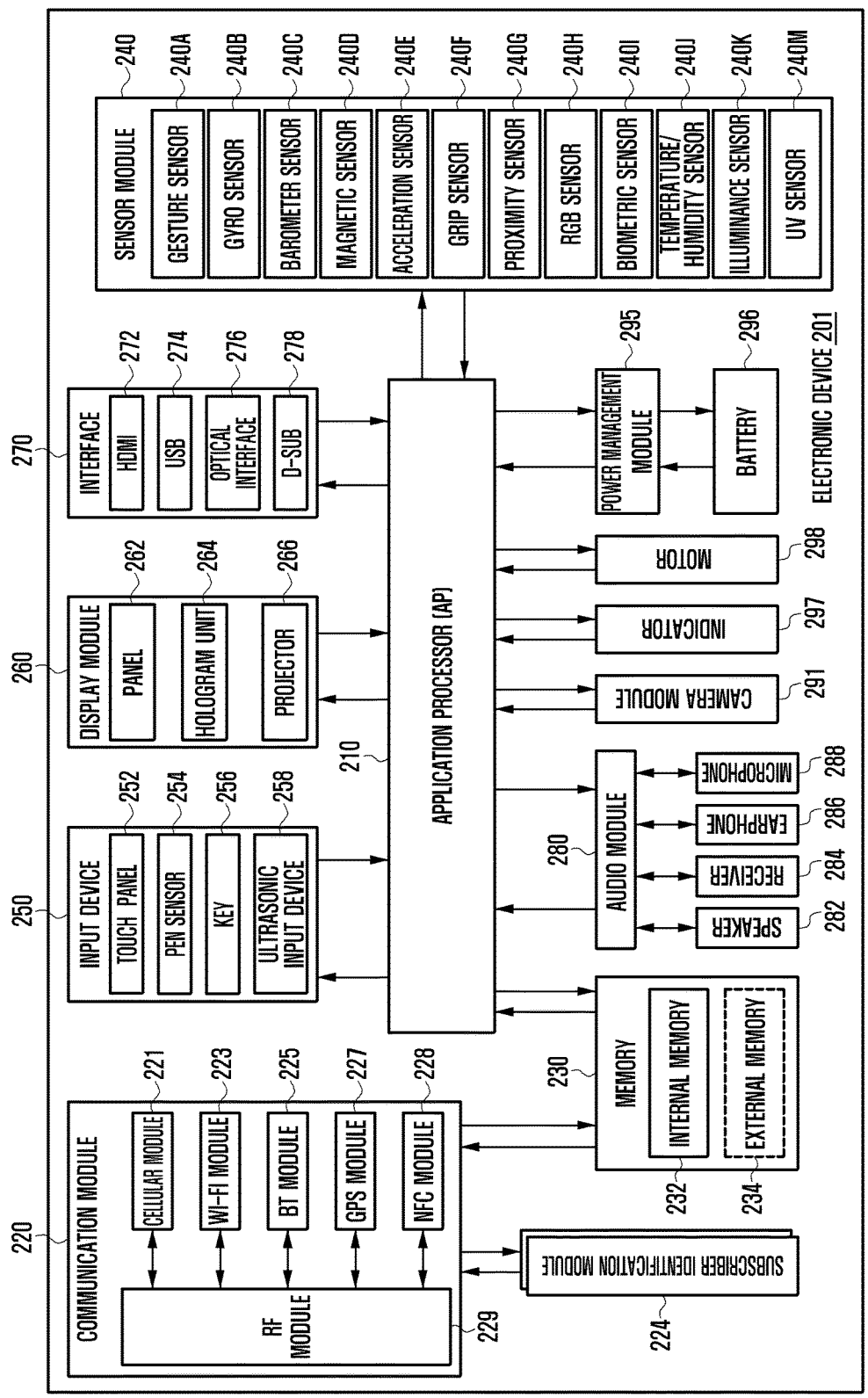
FIG. 2 is a block diagram of a configuration of an electronic device, according to an embodiment of the present disclosure.

FIG. 2 is a block diagram of a configuration of an electronic device, according to an embodiment of the present disclosure.

Referring to FIG. 2, an electronic device 201 is provided. The electronic device 201 may include part or all of the components in the electronic device 101 shown in FIG. 1. The electronic device 201 includes one or more processors 210 (e.g., application processors (APs)), a communication module 220, a subscriber identification module (SIM) 224, a memory 230, a sensor module 240, an input device 250, a display module 260, an interface 270, an audio module 280, a camera module 291, a power management module 295, a battery 296, an indicator 297, and a motor 298.

The processor 210 drives an operating system or an application program to control a plurality of hardware or software components connected to the processor 210, processing various data, and performing operations. The processor 210 may be implemented as, for example, a System on Chip (SoC). The processor 210 may further include a graphic processing unit (GPU) and/or an image signal processor. The processor 210 may also include at least some of the components of the electronic device 201, e.g., a cellular module 221. The processor 210 loads commands or data received from at least one of the other components (e.g., a non-volatile memory) on a volatile memory and processes the loaded commands or data. The processor 210 stores various data in a non-volatile memory.

The communication module 220 may include the same or similar configurations as the communication interface 170 shown in FIG. 1. For example, the communication module 170 includes a cellular module 221, WiFi module 223, Bluetooth (BT) module 225, GNSS module 227 (e.g., a GPS module, Glonass module, Beidou module or Galileo module), NFC module 228, and radio frequency (RF) module 229.

The cellular module 221 provides a voice call, a video call, an SMS service, an Internet service, etc., through a communication network. The cellular module 221 identifies and authenticates an electronic device 201 in a communication network by using the SIM 224. The cellular module 221 performs at least part of the functions provided by the processor 210. The cellular module 1721 may also include a communication processor (CP).

Each of the WiFi module 223, the BT module 225, the GNSS module 227, and the NFC module 228 may include a processor for processing data transmitted or received through the corresponding module. At least part of the cellular module 221, WiFi module 223, BT module 225, GNSS module 227, and NFC module 228 (e.g., two or more modules) may be included in one integrated chip (IC) or one IC package.

The RF module 229 transmits/receives communication signals, e.g., RF signals. The RF module 229 may include a transceiver, a power amp module (PAM), a frequency filter, a low noise amplifier (LNA), an antenna, etc. At least one of the following modules: cellular module 221, WiFi module 223, BT module 225, GNSS module 227, and NFC module 228 transmits and receives RF signals through a separate RF module.

The SIM module 224 includes a card including a SIM and/or an embodied SIM. The SIM module 224 contains unique identification information, e.g., integrated circuit card identifier (ICCID), or subscriber information, e.g., international mobile subscriber identity (IMSI).

The memory 230 (e.g., memory 130 shown in FIG. 1) includes a built-in memory 232 or an external memory 234. The built-in memory 232 may include at least one of the following: a volatile memory, e.g., a dynamic RAM (DRAM), a static RAM (SRAM), a synchronous dynamic RAM (SDRAM), etc.; and a non-volatile memory, e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 234 may include a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 234 may be connected to the electronic device 201, functionally and/or physically, through various interfaces.

The sensor module 240 measures or detects a physical quantity or an operation state of the electronic device 201, and converts the measured or detected information into an electronic signal. The sensor module 240 includes at least one of the following: a gesture sensor 240A, a gyro sensor 240B, an atmospheric pressure sensor 240C, a magnetic sensor 240D, an acceleration sensor 240E, a grip sensor 240F, a proximity sensor 240G, a red, green and blue (RGB) sensor 240H, a biometric sensor 240I, a temperature/humidity sensor 240J, an illuminance sensor 240K, and a ultraviolet (UV) sensor 240M. Additionally or alternatively, the sensor module 240 of further including an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 of further including a control circuit for controlling one or more sensors included therein. In embodiments, the electronic device 201 includes a processor, configured as part of the processor 210 or a separate component, for controlling the sensor module 240. In this case, while the processor 210 is operating in sleep mode, the processor controls the sensor module 240.

The input device 250 includes a touch panel 252, a (digital) pen sensor 254, a key 256, or an ultrasonic input unit 258.

The touch panel 252 may be implemented with at least one of the following: a capacitive touch system, a resistive touch system, an infrared touch system, and an ultrasonic touch system. The touch panel 252 may further include a control circuit. The touch panel 252 may also further include a tactile layer to provide a tactile response to the user.

The (digital) pen sensor 254 may be implemented with a part of the touch panel 252 or with a separate recognition sheet.

The key 256 may include a physical button, an optical key, or a keypad.

The ultrasonic input unit 258 of detecting ultrasonic waves, created in an input tool, through a microphone 288, and identifying data corresponding to the detected ultrasonic waves.

The display 260 (e.g., the display 160 shown in FIG. 1) includes a panel 262, a hologram unit 264, or a projector 266.

The panel 262 may include the same or similar configurations as the display 160 shown in FIG. 1. The panel 262 may be implemented to be flexible, transparent, or wearable. The panel 262 may also be incorporated into one module together with the touch panel 252.

The hologram unit 264 of showing a stereoscopic image in the air by using light interference.

The projector 266 displays an image by projecting light onto a screen. The screen may be located inside or outside of the electronic device 201.

The display 260 may further include a control circuit for controlling the panel 262, the hologram unit 264, or the projector 266.

The interface 270 includes a high-definition multimedia interface (HDMI) 272, a universal serial bus (USB) 274, an optical interface 276, or a D-subminiature (D-sub) 278. The interface 270 may be included in the communication interface 170 shown in FIG. 1. Additionally or alternatively, the interface 270 may include a mobile high-definition link (MHL) interface, a secure digital (SD) card/multimedia card (MMC) interface, or an infrared data association (IrDA) standard interface.

The audio module 280 provides bidirectional conversion between a sound and an electronic signal. At least part of the components in the audio module 280 may be included in the input/output interface 150 shown in FIG. 1. The audio module 280 processes sound information input or output through a speaker 282, a receiver 284, earphones 286, or a microphone 288.

The camera module 291 is a device capable of taking both still and moving images. The camera module 291 may include one or more image sensors (e.g., a front image sensor or a rear image sensor), a lens, an image signal processor (ISP), a flash (e.g., an LED or xenon lamp), etc.

The power management module 295 manages power of the electronic device 201. The power management module 295 includes a power management integrated circuit (PMIC), a charger IC, or a battery gauge. The PMIC may employ wired charging and/or wireless charging methods. Examples of the wireless charging method are magnetic resonance charging, magnetic induction charging, and electromagnetic charging. To this end, the PMIC may further include an additional circuit for wireless charging, such as a coil loop, a resonance circuit, a rectifier, etc. The battery gauge measures the residual capacity, charge in voltage, current, or temperature of the battery 296. The battery 296 takes the form of either a rechargeable battery or a solar battery.

The indicator 297 displays a specific status of the electronic device 201 or a part thereof (e.g., the processor 210), e.g., a boot-up status, a message status, a charging status, etc.

The motor 298 converts an electrical signal into mechanical vibrations, such as, a vibration effect, a haptic effect, etc.

The electronic device 201 may further include a processing unit (e.g., GPU) for supporting a mobile TV. The processing unit for supporting a mobile TV processes media data pursuant to standards, e.g., digital multimedia broadcasting (DMB), digital video broadcasting (DVB), or media-Flo™, etc.

Figure 3:
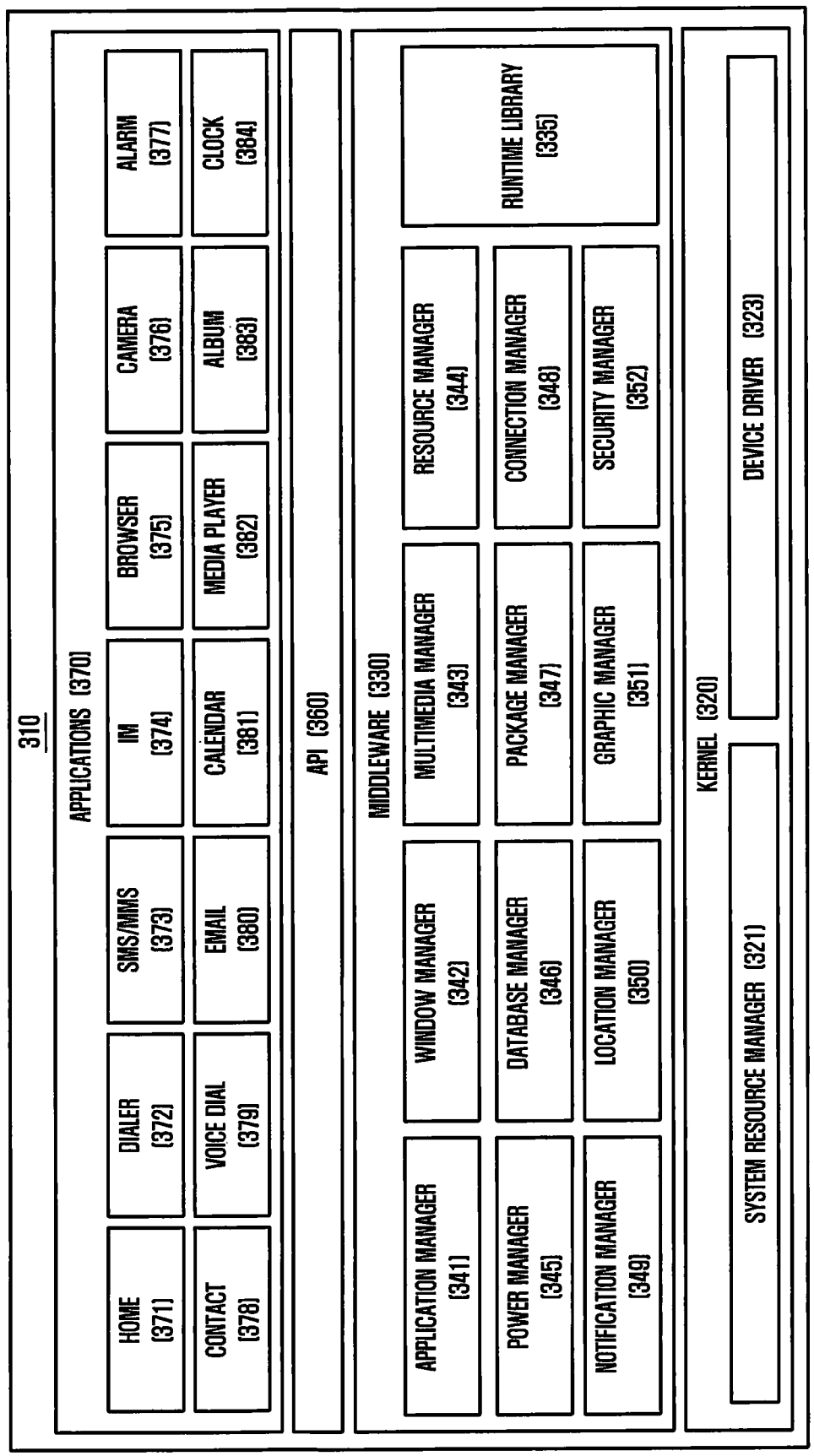
FIG. 3 is a block diagram of a program module, according to an embodiment of the present disclosure.

FIG. 3 is a block diagram of a program module, according to an embodiment of the present disclosure.

Referring to FIG. 3 a program module 310 of the electronic device 101 is provided. The program module 310 includes an operation system (OS) for controlling resources related to the electronic device 101 and/or various applications running on the OS. The OS may be Android™, iOS™, Windows™, Symbian™, Tizen™, Bada™, etc.

The program module 310 includes a kernel 320, middleware 330, application programming interface (API) 360 and/or applications 370. At least part of the program module 310 may be preloaded on the electronic device 101 or downloaded from the external electronic devices 102 or 104 or the server 106.

The kernel 320 (for example, kernel 141) may include a system resource manager 321 and/or a device driver 323. The system resource manager 321 may include a process manager, a memory manager, and a file system manager. The system resource manager 321 may perform a system resource control, allocation, and recall. The device driver 323 may include, for example, a display driver, a camera driver, a Bluetooth driver, a shared memory driver, a USB driver, a keypad driver, a WiFi driver, and an audio driver. Further, the device driver 323 may include an inter-process communication (IPC) driver.

The middleware 330 may provide a function required in common by the applications 370. Further, the middleware 330 may provide a function through the API 360 to allow the applications 370 to efficiently use limited system resources within the electronic device 101. The middleware 330 includes at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 is a library module used by a complier to add a new function through a programming language while the applications 370 are executed. The runtime library 335 executes input and output, management of a memory, a function associated with an arithmetic function and the like.

The application manager 341 may manage a life cycle of at least one of the applications 370.

The window manager 342 may manage GUI resources used on the screen.

The multimedia manager 343 may detect a format required for reproducing various media files and perform an encoding or a decoding of a media file by using a codec suitable for the corresponding format.

The resource manager 344 manages resources such as a source code, a memory, or a storage space of at least one of the applications 370.

The power manager 345 may operate together with a basic input/output system (BIOS) to manage a battery or power, and provides power information required for the operation.

The database manager 346 may manage generation, search, and change of a database to be used by at least one of the applications 370.

The package manager 347 may manage an installation or an update of an application distributed in a form of a package file.

The connection manager 348 may manage a wireless connection such as WiFi or Bluetooth.

The notification manager 349 may display or notify a user of an event such as an arrival message, an appointment, a proximity alarm or the like, in a manner that does not disturb the user.

The location manager 350 may manage location information of the electronic device 101.

The graphic manager 351 may manage a graphic effect provided to the user or a user interface related to the graphic effect.

The security manager 352 provides a general security function required for a system security or a user authentication.

When the electronic device 101 has a call function, the middleware 330 may further include a telephony manager for managing a voice of the electronic device or a video call function.

The middleware 330 includes modules configuring various combinations of functions of the above described components. The middleware 330 provides modules specialized according to types of operation systems to provide distinct functions. The middleware 330 may be adaptively configured in such a way as to remove part of the existing components or to include new components.

The API 360 (for example, API 145) may be a set of API programming functions, and may be provided with a different configuration according to an operating system. For example, in Android™ or iOS™, a single API set may be provided for each platform. In Tizen™, two or more API sets may be provided.

The applications 370 may include one or more applications for performing various functions, e.g., home 371, dialer 372, SMS/MMS 373, instant message (IM) 374, browser 375, camera 376, alarm 377, contact 378, voice dial 379, email 380, calendar 381, media player 382, album 383, and clock 384. The applications 370 may additionally include a health care application for measuring amount of exercise, blood sugar level, etc., and environment information application for providing atmospheric pressure, humidity, temperature, etc.

The applications 370 include an information exchange application for supporting information exchange between the electronic device 101 and the external electronic devices 102 and 104. The information exchange application includes a notification relay application for relaying specific information to external devices or a device management application for managing external devices.

The notification relay application relays notification information, created in other applications of the electronic device 101 (e.g., SMS/MMS application, email application, health care application, environment information application, etc.), to the external electronic devices 102 and 104. In addition, the notification relay application receives notification information from external devices to provide the received information to the user.

The device management application manages (e.g., installs, removes, and updates) at least one function of the external electronic devices 102 and 104 communicating with the electronic device 101. Examples of the function are a function of turning-on/off the external device or part of the external device, a function of controlling the brightness (or resolution) of the display, applications running on the external device, services provided by the external device, etc. Examples of the services are a call service, messaging service, etc.

The applications 370 may include an application (e.g., a health care application of a mobile medical device, etc.) based on specified attributes of the external electronic devices 102 and 104. The applications 370 may include applications received from the server 106 or the external electronic devices 102 and 104. The applications 370 may include a preloaded application or third party applications that can be downloaded from the server 106. It should be understood that the components of the program module 310 may be referred to by different names according to the type of operating system.

At least part of the program module 310 can be implemented with software, firmware, hardware, or any combination of two or more of them. At least part of the program module 310 can be implemented (e.g., executed) by the processor 210. At least part of the programming module 310 may include modules, programs, routines, sets of instructions or processes, etc., in order to perform one or more functions.

Figure 4:
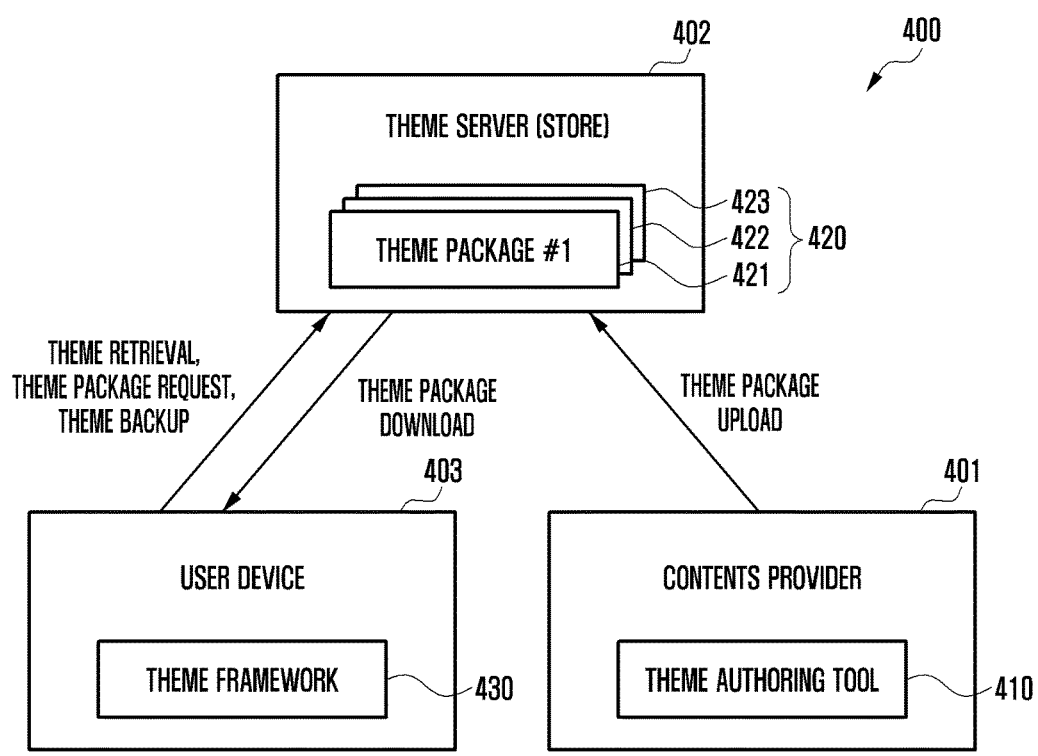
FIG. 4 is a block diagram of a system environment, according an embodiment of the present disclosure.

FIG. 4 is a block diagram of a system environment, according an embodiment of the present disclosure.

Referring to FIG. 4, a system environment 400 is provided. The system environment 400 may include a contents provider 401, a theme server 402, and a user device 403.

The contents provider 401 may create a theme package 420 by using a theme authoring tool 410 and then upload the created theme package 420 to the theme server 402.

The theme server 402 may store various theme packages 421, 422 and 423 uploaded by at least one contents provider 401. The theme server 402 may provide a free or paid theme package, in response to a request of the user device 403.

The user device 403 may download the theme packages 421, 422 and 423 from the theme server 402 and then install the downloaded theme packages on the user device 403.

As used herein, the term "theme data" may include data (e.g., theme resource data) about a consistent format, such as a background image, a color, a sound, etc. of a home screen, a lock screen, or an application execution screen of an electronic device. Additionally, the "theme data" may also include data (e.g., theme layout data) about the arrangement of objects (e.g., icons or widgets of an application) that comply with the consistent format.

The "theme data" may include data regarding a theme layout, a theme GUI, and/or a function of each theme. For example, the theme layout may include the arrangement of a background image in a home screen and/or a lock screen, the arrangement of an application and a widget, and the like. For example, the theme GUI may include a background image of a home screen and/or a lock screen, an execution screen of an application (e.g., a messenger application, a scheduler application, etc.), a shape of an icon, and the like. For example, the theme function may include a cover screen theme, a change of ringtone, a scheduler link, an installation of other specific application, or the like.

The "theme data" may be packaged in software and then, in the form of a "theme package", transmitted or shared through various networks. For example, the "theme package" may be implemented as an Android™ application package (APK) file in the Android™ OS system.

The contents provider 401 (e.g., the first external electronic device 104 in FIG. 1) may create a theme package by using the theme authoring tool 410. The contents provider 401 may upload the created theme package to the theme server 402 or to the contents provider server. The contents provider 401 may also provide various kinds of update information associated with a theme to the user device 403 and/or the theme server 402.

The theme authoring tool 410 may provide a function for allowing the contents provider 401 to author and distribute a suitable theme for a theme framework 430 of the user device 403. The theme authoring tool 410 may support a drag & drop function and a preview function, and also apply an animating image as well as a still image to a background screen or an object (e.g., an icon, a widget, etc.) when authoring a theme. Additionally, the theme authoring tool 410 may support a layout setting as a user desires. Any function which is not supported by the theme authoring tool 410 may be developed by a user through extensible markup language (XML). The authoring tool 410 may be implemented as a variety of types. For example, the theme authoring tool 410 may include a suitable type for a mobile electronic device.

The theme server 402 may store the theme package 420 authored and uploaded by the contents provider 401. The theme server 402 may provide a corresponding theme package in response to a request of the user device 403. The user device 403 may perform a backup of the theme package, applied thereto, into the theme server 402. The theme server 402 may correspond to a market (or a store) where free or paid theme packages can be transacted.

The user device 403 may retrieve theme packages from the theme server 402 and then request a specific theme package from among the retrieved theme packages. For example, the user device 403 may correspond to the electronic device 101 in FIG. 1 or electronic device 201 in FIG. 2. As used herein, the term "user device" may refer to the "electronic device".

The user device 403 may download a specific theme package corresponding to the above request. The user device 403 may receive update information from the theme server 402 or the contents provider server by using uniform resource locator (URL) information extracted from the theme packages 421, 422 and 423, and then apply the update information to device setting. The user device 403 may manage the theme package 420 on the basis of the theme framework 430 embedded therein.

Figure 5:
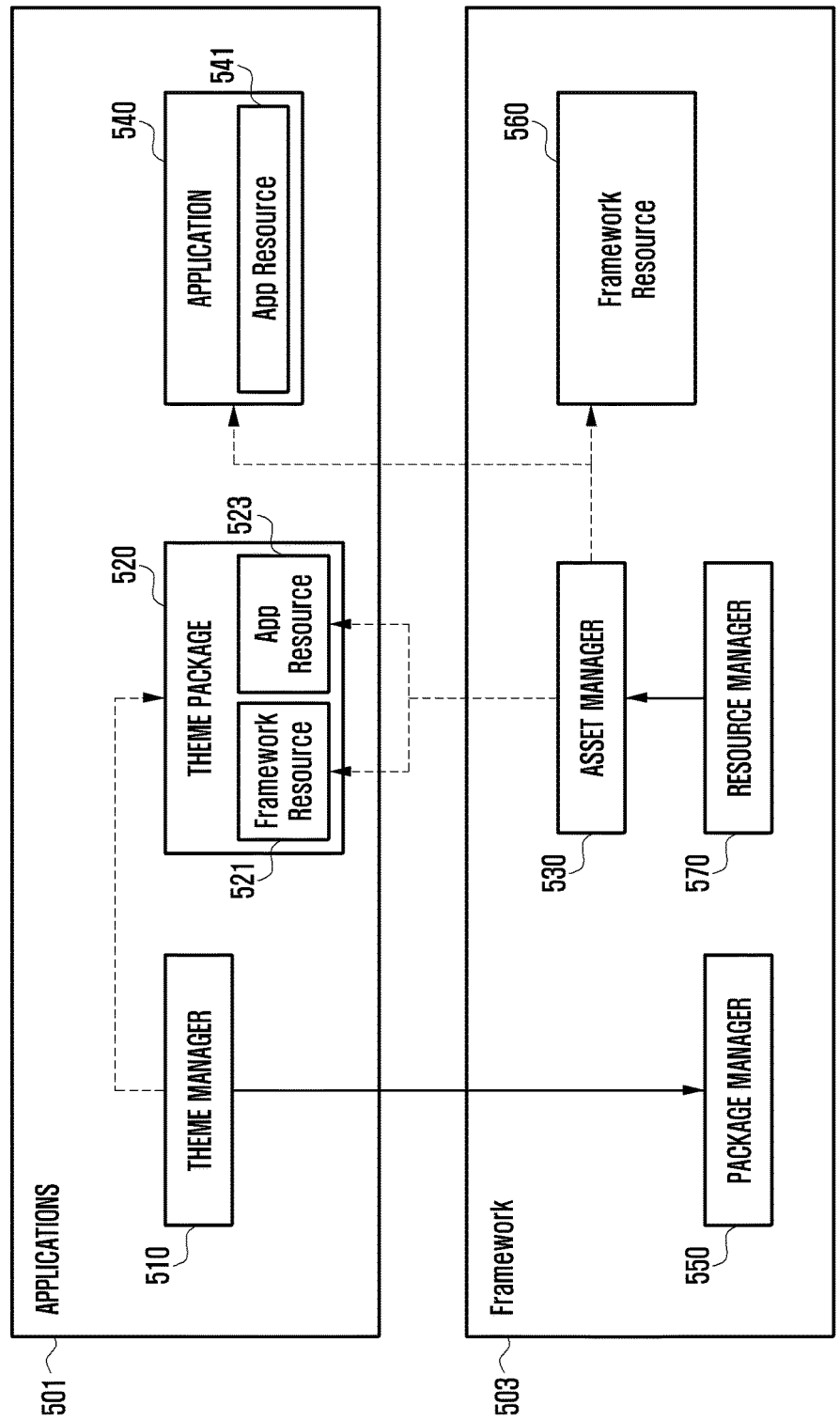
FIG. 5 is a block diagram of a structure of a theme platform, according to an embodiment of the present disclosure.

FIG. 5 is a block diagram of a structure of a theme platform, according to an embodiment of the present disclosure.

Referring to FIG. 5, the theme platform of the electronic device 101 may be divided into a part applied to applications 501 and another part applied to a framework 503. For example, the electronic device 101 may download a theme package 520 from the theme server 402 and then store the theme package 520 in the memory 130. Also, using a package manager 550, the electronic device 101 may install the theme package 520. Separately, the electronic device 101 may store the theme package 520 in the memory 130 by a user and then install the stored theme package 520 through a package installer program. The theme package 520 may include a framework resource 521 and an application resource 523 in the form of sub-packages. These resources may include all elements of a GUI, such as images, color values, screen layouts, and the like. Also, these resources may include data or information associated with at least one of images, colors, tones, symbols, typefaces, icons, background screens, and sounds, all of which are used for the theme. The theme package 520 may include a function associated with the theme. This function may include data or information associated with at least one of the definition of operations of a target application required for applying the theme, a theme change notification, a location control of a file having to be referred to, a feature update, and a widget control. In this disclosure, installing the theme package 520 may mean installation of sub-packages contained in the theme package 520.

When a specific theme is selected by a user, the electronic device 101 may enable the theme manager 510 to activate the theme package 520 corresponding to the specific theme. Also, by the resource manager 570, an asset manager 530 may refer to the activated theme package 520. Based on the theme package 520 that corresponds to the specific theme, the asset manager 530 may change an application resource 541 of each application 540 and a framework resource 560 to resources corresponding to the specific theme.

When there is a user's request for a change to a specific theme, a change of a theme resource may mean displaying, on a screen, resources contained in the theme package of the specific theme rather than default resources contained in an application. Namely, a single theme sub-package may be mapped to the each target application to which the specific theme is applied. As a result, a single theme package may include both a sub-package mapped to the framework resource 560 and a sub-package mapped to the application resource 541 of the target application. When any single theme is installed and applied, the electronic device 101 may perform operations of installing and activating all sub-packages.

Although the theme manager 510 and the package manager 550 are discussed separately in the above description, both may be implemented as a single element. Similarly, although FIG. 5 shows the package manager 550 contained in the framework part 503 and the theme manager 510 contained the application part 501, both may be integrated with each other. The package manager 550 may be an application manager, depending on operating systems. Also, module names such as the theme manager 510 and the package manager 550 may be changed depending on the operating system.

The electronic device 101 may include a touch screen display, a wireless communication circuit, a processor electrically connected with the touch screen display and the wireless communication circuit, and a memory electrically connected with the processor. In this electronic device 101, the memory stores instructions causing, when executed, the processor to receive a file from an external device through the communication circuit, the file including a package which contains one or more sub-packages each of which has at least one resource and/or function for implementing a theme to be displayed on the display, to select one of installation procedures having different installation times so as to install the sub-packages in the electronic device, to install the sub-packages by using the selected installation procedure, and to display at least part of the theme on the display by using the installed sub-packages.

Figure 6:
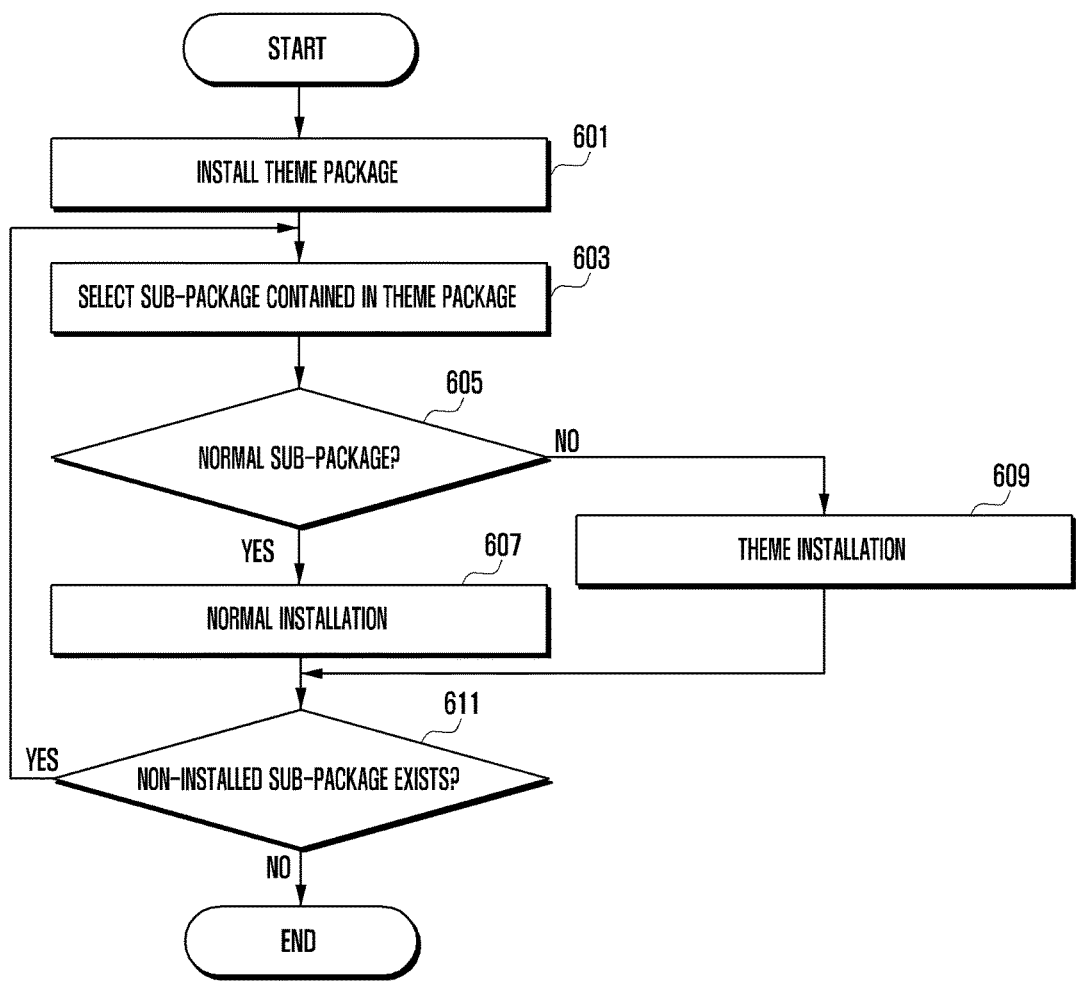
FIG. 6 is a flowchart of a process of installing a theme package, according to an embodiment of the present disclosure.

FIG. 6 is a flowchart of a process of installing a theme package, according to an embodiment of the present disclosure.

Referring to FIG. 6, at step 601, the processor 120 of the electronic device 101 may install a theme package. For example, the processor 120 may download the theme package from the server 106 and then install the downloaded theme package. Alternatively, the processor 120 may read a theme package stored in the memory 130 and then install the theme package.

At step 603, the processor 120 may select a sub-package included in the theme package. The theme manager 510 of the electronic device 101 may request the package manager 550 to classify and install sub-packages contained in the theme package. The package manager 550 may previously classify the sub-packages. This classification may be an operation of classifying the sub-packages into a normal sub-package, i.e., a target of "normal installation", and a theme sub-package, i.e., a target of "theme installation". The processor 120 may distinguish the theme sub-package from the normal sub-package by checking file names of sub-packages or through an additional file (e.g., "themes.json") having a tag, a manifest, or any other specific-type information. At step 603, the processor 120 may select at least one sub-package from among the classified sub-packages.

At step 605, the processor 120 may determine whether the selected sub-package is a normal sub-package. For example, a normal sub-package may be a sub-package that corresponds to "lock", "home", "app icon", or "wallpaper". Such a normal sub-package may be installed through a generally performed package installation process.

If it is determined at step 605 that the selected sub-package is a normal sub-package, the processor 120 may perform "normal installation" at step 607.

If it is determined at step 605 that the selected sub-package is not a normal sub-package, and instead a theme sub-package, the processor 120 may perform "theme installation" at step 609. Herein, the "theme installation" may be a predetermined installation process in which an installation process irrelevant to the theme sub-package is omitted from the installation processes, thereby reducing the installation time of the theme package by allowing "theme installation" with regard to the theme sub-packages.

At step 611, the processor 120 may determine whether there is any non-installed sub-package. If there is a non-installed sub-package, the processor 120 may return to step 603 and select again the sub-package. If there is no non-installed sub-package, the processor 120 may complete the process of installing the theme package.

Figure 7B:
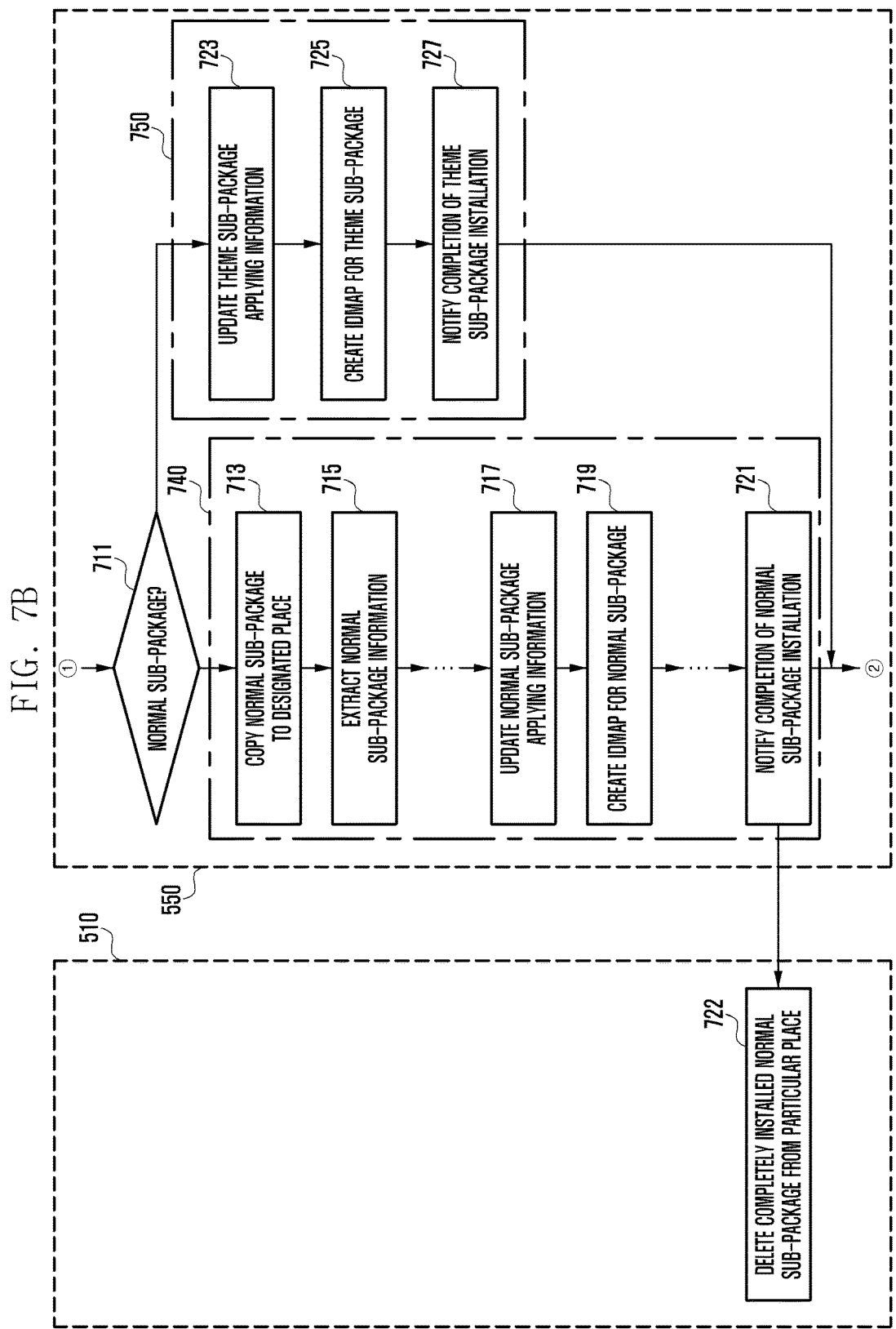
Figure 7C:
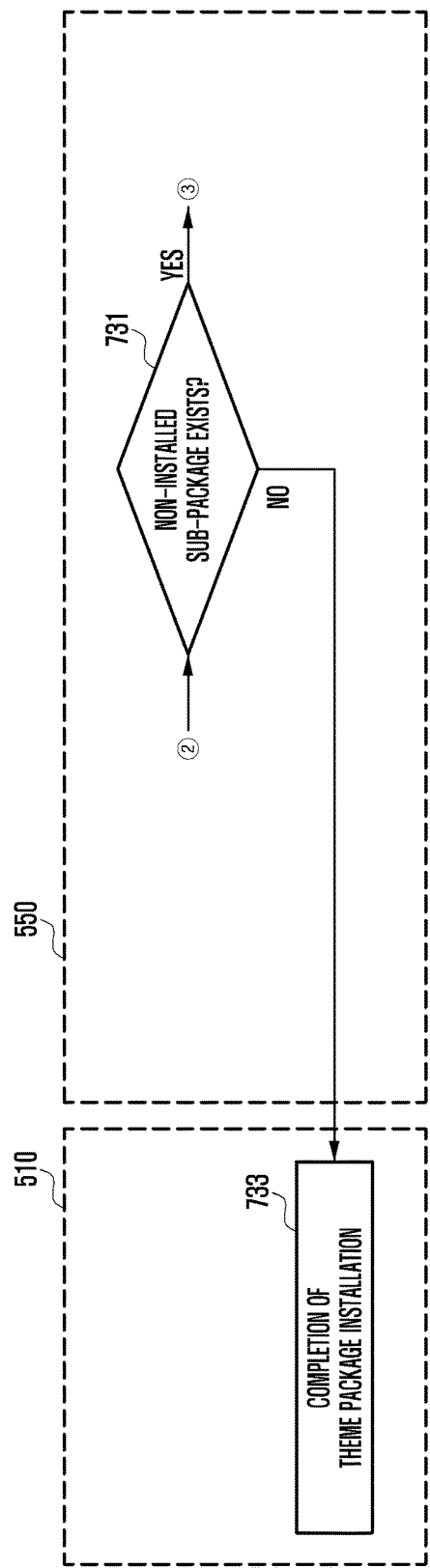

FIGS. 7A to 7C are flow diagrams of operations performed by a theme manager and a package manager in a process of installing a theme package, according to an embodiment of the present disclosure.

Referring to FIGS. 7A to 7C, operation flows are divided into two parts. The left flow shows the operations of the theme manager 510, and the right flow shows the operations of the package manage 550.

Referring to 7A, at operation 701, the package manager 550 may install a theme package. At this operation, the package manager 550 may install the theme package downloaded from the theme server or stored in the memory 130 of the electronic device 101. The package manager 550 may deliver, to the theme manager 510, information indicating that the theme package is installed.

At operation 703, the theme manager 510 may extract a sub-package from the installed theme package.

At operation 705, the theme manager 510 may copy the extracted sub-package to a particular place, which may be a storage space of the electronic device 110. For example, the extracted sub-package may be two or more sub-packages, and the theme manager 510 may copy such sub-packages to a particular place so as to determine whether the installation of two or more sub-packages is completed.

At operation 707, the theme manager 510 may classify the sub-packages and request the package manager 550 to install the sub-packages.

At operation 709, the package manager 550 may select one of sub-packages which is the target of installation requested by the theme manager 510. Although it is described above that the theme manager 510 performs the classification of sub-packages, this is merely illustrative and not to be construed as a limitation. Alternatively, such classification of sub-packages may be performed by the package manager 550. If the theme manager 510 performs the classification of sub-packages, the package manager 550 may perform installation based on such classification. Also, the package manager 550 may classify the sub-packages into normal sub-packages and theme sub-packages. The normal sub-package may be installed through a normal installation process (e.g., application installation), and the theme sub-package may be installed through a normal installation process from which all steps irrelevant to the theme sub-package are removed. Namely, the normal sub-package may be installed on the basis of "normal installation", and the theme sub-package may be installed on the basis of "theme installation". The package manager 550 may distinguish the theme sub-package from the normal sub-package by checking file names of sub-packages or through an additional file (e.g., "themes.json") having a tag, a manifest, or any other specific-type information. The above-mentioned additional file (e.g., "themes.json") may be contained individually in each sub-package. Also, the sub-package may have a pseudo-code for distinguishing the theme sub-package from the normal sub-package, and thus the package manager 550 may classify the sub-packages into the normal sub-packages and the theme sub-packages through such pseudo-codes.

At operation 709, the package manager 550 may select one of the classified sub-packages and then perform the next operation 711, indicated by reference numeral 10, and shown in FIG. 7B.

Referring to FIG. 7B, at operation 711, the package manager 550 may determine whether the selected sub-package is a normal sub-package. If the selected sub-package is a normal sub-package, the package manager 550 may install the sub-package in the manner of "normal installation" 740. If the selected sub-package is not a normal sub-package, the package manager 550 may install the sub-package in the manner of "theme package" 750. In FIG. 7B, the "normal installation" 740 and the "theme installation" 750 are separated from each other, and the "theme installation" 750 may be a predetermined installation process for performing only some operations selected from installation operations of the "normal installation" 740.

In case of the "normal installation" 740, if it is determined at operation 711 that the selected sub-package is a normal sub-package, the package manager 550 may copy the normal sub-package to a designated place at operation 713. The designated place may be a storage space formed of normal sub-packages. Also, the package manager 500 may add the normal sub-package to a list of normal sub-packages.

At operation 715, the package manager 550 may extract normal sub-package information. Then, in the "normal installation" 740, the package manager 550 may perform operations of determining an application UID associated with the normal sub-package and creating a directory associated with the normal sub-package. Such operations are not illustrated or described in detail since they are well known and commonly performed operations.

At operation 717, the package manager 550 may update normal sub-package applying information. Since the sub-package contains a resource for a theme change of a specific target application, the sub-package may also have information about which application is a target. At operation 717, the package manager 550 may check information about a target application of a normal sub-package and then add information of the normal sub-package to a resource reference path of that application. Thee update of the normal sub-package applying information may mean adding information of the normal sub-package to the resource reference path of the target application of the normal sub-package.

At operation 719, the package manager 550 may create an identification map (IDMAP) regarding the normal sub-package. For example, in case of requesting a resource corresponding to a specific ID in an application, the processor 120 may read and provide a certain resource, in the sub-package corresponding to a currently applied theme, rather than an original resource. In this case, a data structure for indicating how an identification information value (e.g., a unique ID) of an application is connected with a sub-package may be the IDMAP. The creation of the IDMAP may mean creating an IDMAP data structure having resource connection information between the sub-package and the target application. Since the subsequent operations are well known and commonly performed, they are not illustrated or described in detail.

At operation 721, the package manager 550 may check whether the installation of the normal sub-package is completed.

Operations 713 to 721 may be an installation process corresponding to the "normal installation" 740.

After the installation of the normal sub-package is completed, the package manger 550 may notify installation completion information to the theme manager 510.

At operation 722, the theme manager 510 may delete the completely installed normal sub-package from the particular place. Since the normal sub-package is copied to the designated place by the package manager 550 at operation 713, the normal sub-package copied to the particular place at operation 705 may be deleted. That is, at operation 722, the theme manager 510 may delete a sub-package corresponding to the normal sub-package from among the sub-packages copied to the particular place.

The "normal installation" 740 may be referred to as a first procedure, which may include an operation of copying a file associated with a sub-package to a designated place. Additionally, the first procedure may include operations of determining application identification information associated with the sub-package and creating a directory associated with the sub-package. Also, the first procedure may include an operation of creating resource connection information (IDMAP) between the sub-package and the target application.

In case of the "theme installation" 750, if it is determined at operation 711 that the selected sub-package is not a normal sub-package, the package manager 550 may update theme sub-package applying information at operation 723. As discussed above at operation 717, the package manager 550 may add information of a theme sub-package to a resource reference path of a target application of the theme sub-package.

At operation 725, the package manger 550 may create an IDMAP regarding the theme sub-package. As discussed above at operation 719, the package manager 550 may create the IDMAP having resource connection information between the theme sub-package and the target application.

At operation 727, the package manager 550 may check whether the installation of the theme sub-package is completed.

Operations 723 to 727 may be an installation process corresponding to the "theme installation" 750.

The theme sub-package may apply a theme to the electronic device 101 through only an installation process corresponding to the "theme installation" 750. Accordingly, an installation time of a theme package may be reduced by setting the "theme installation" 750 corresponding to theme sub-package.

The "theme installation" 750 may be referred to as a second procedure, which may include an operation of creating resource connection information (IDMAP) between the sub-package and the target application. The second procedure is characterized by excluding at least one of operations of copying a file associated with the sub-package to a designated place, determining an application UID associated with the sub-package, and creating a directory associated with the sub-package.

Table 1 shows a comparison between an installation times when using only "normal installation" according to a conventional technique and an installation time when using both "normal installation" and "theme installation" according to a method of the present disclosure. Table 1 shows experimental results of installing theme packages with regard to two themes ("AVENGERS-IRON MAN" and "Gladiator").

TABLE 1

| <Comparison of Theme Package Installation Time> | | |
| --- | --- | --- |
| Theme | Conventional | Present Disclosure |
| Avengers-Iron Man | 42.39 s | 3.07 s |
| Gladiator | 35.63 s | 2.95 s |

As shown in Table 1, it takes 42.39 seconds to install a theme package of "AVENGERS-IRON MAN" by using the conventional "normal installation" method. While it takes 3.07 seconds to install the same theme package by using the method of the present disclosure of separately performing "normal installation" and "theme installation". Accordingly, the processor 120 of the electronic device 101 according to the present disclosure may install a theme package more quickly by separately performing "normal installation" and "theme installation".

After the "normal installation" 740 or the "theme installation" 750 is completed, the package manager 550 may perform the next operation 731 indicated by a reference numeral ②, and shown in 7C.

Referring to FIG. 7C, at operation 731, the package manager 550 may determine whether there is any non-installed sub-package. For example, the package manager 550 may perform this determination based on a list of sub-packages received from the theme manager 510 at operation 707. If it is determined at operation 731 that there is no non-installed sub-package, the package manager 550 may deliver this information to the theme manager 510.

At operation 733, the theme manager 510 may determine that the installation of the theme package is completed.

If it is determined at operation 731 that there is a non-installed sub-package, the package manager 550 may return to a previous operation 709, as indicated by a reference numeral ③ and as shown in FIG. 7A. Additionally, the processor 120 of the electronic device 101 may exclude the sub-package, determined as the theme sub-package by classification, from a package list to be checked at booting. Since the theme sub-package is irrelevant to a booting process and thus not contained in the package check list at booting, a booting time of the electronic device 101 may be reduced.

Table 2 shows a comparison between a booting time in case of using only "normal installation" according to a conventional technique and a booting time when using both "normal installation" and "theme installation" according to the method of the present disclosure. Table 2 shows experimental results of booting times when the number of theme packages contained in the package check list is thirty and fifty.

TABLE 2

<Comparison of Booting Time in View of Theme Package Numbers>

| Number of Themes | Conventional | Present Disclosure |
|---|---|---|
| 30 | 48.32 s | 18.58 s |
| 50 | 94.15 s | 19.82 s |

As shown in Table 2, if thirty theme packages are installed using only the typical "normal installation" method, a booting time measures 48.32 seconds. While if the same theme packages are installed using the method of the present disclosure of separately performing "normal installation" and "theme installation", a booting time measures 18.58 seconds. Accordingly, the processor 120 of the electronic device 101 according to the present disclosure may reduce a booting time by separately performing "normal installation" and "theme installation".

Accordingly, a plurality of sub-packages may be classified into two types, i.e., normal sub-packages and theme sub-packages, and then apply different installation techniques to two types of sub-packages. Namely, the normal sub-packages may be installed through "normal installation", and the theme sub-packages may be installed through "theme installation". Since the installation procedure of theme sub-packages is simplified, a time required for the package installation can be reduced considerably. In addition, since sub-packages determined as theme sub-packages by classification are not contained in a package list to be checked at booting, a booting time can be also reduced.

According to various embodiments of the present disclosure, the above-discussed method for operating an electronic device that may include a touch screen display, a wireless communication circuit and a processor is provided to improve an installation speed of a theme package. This method includes operations of, at the processor, receiving, through the wireless communication circuit, a file including a package which contains one or more sub-packages each of which has at least one resource and/or function for implementing a theme to be displayed on the touch screen display; at the processor, selecting one of installation procedures having different installation times so as to install the sub-packages in the electronic device; at the processor, installing the sub-packages by using the selected installation procedure; and at the processor, displaying at least part of the theme on the touch screen display by using the installed sub-packages.

FIG. 8 illustrates an example of a sub-package contained in a theme package 800, according to an embodiment of the present disclosure.

Referring to FIG. 8, a single theme package 800 may include one or more sub-packages, each of which may correspond to a specific element the electronic device 101. The sub-packages may be classified into normal sub-packages and theme sub-packages. The processor 120 may perform this classification, based on file names of sub-packages or based on an additional file (e.g., "themes.json") having a tag, a manifest, or any other specific-type information. Also, each sub-package may have a pseudo-code for indicating the theme sub-package or the normal sub-package, so that the processor 120 may identify the type of the sub-package on the basis of the pseudo-code. This manner of classifying the sub-packages into normal sub-packages and theme sub-packages is, however, merely an illustrative and not to be construed as a limitation.

Among sub-packages contained in the theme package 800 shown in FIG. 8, four sub-packages, "com.sec.Pink.common.appicon.apk" 811 (i.e., appicon 811), "com.sec.Pink.common.home.apk" 813 (i.e., home 813), "com.sec.Pink.common.lock.apk" 815 (i.e., lock 815), and "com.sec.Pink.common.wallpaper.apk" 817 wallpaper 817), may be determined as normal sub-packages on the basis of the aforementioned classification rule. However, the normal sub-packages are not limited to the above four sub-packages.

The aforementioned four normal sub-packages (i.e., appicon 811, home 813, lock 815, and wallpaper 817) may be installed through the "normal installation" procedure. Additionally, the remaining sub-packages may be theme sub-packages. The theme sub-packages may be installed through the "theme installation" procedure.

Figure 9A:
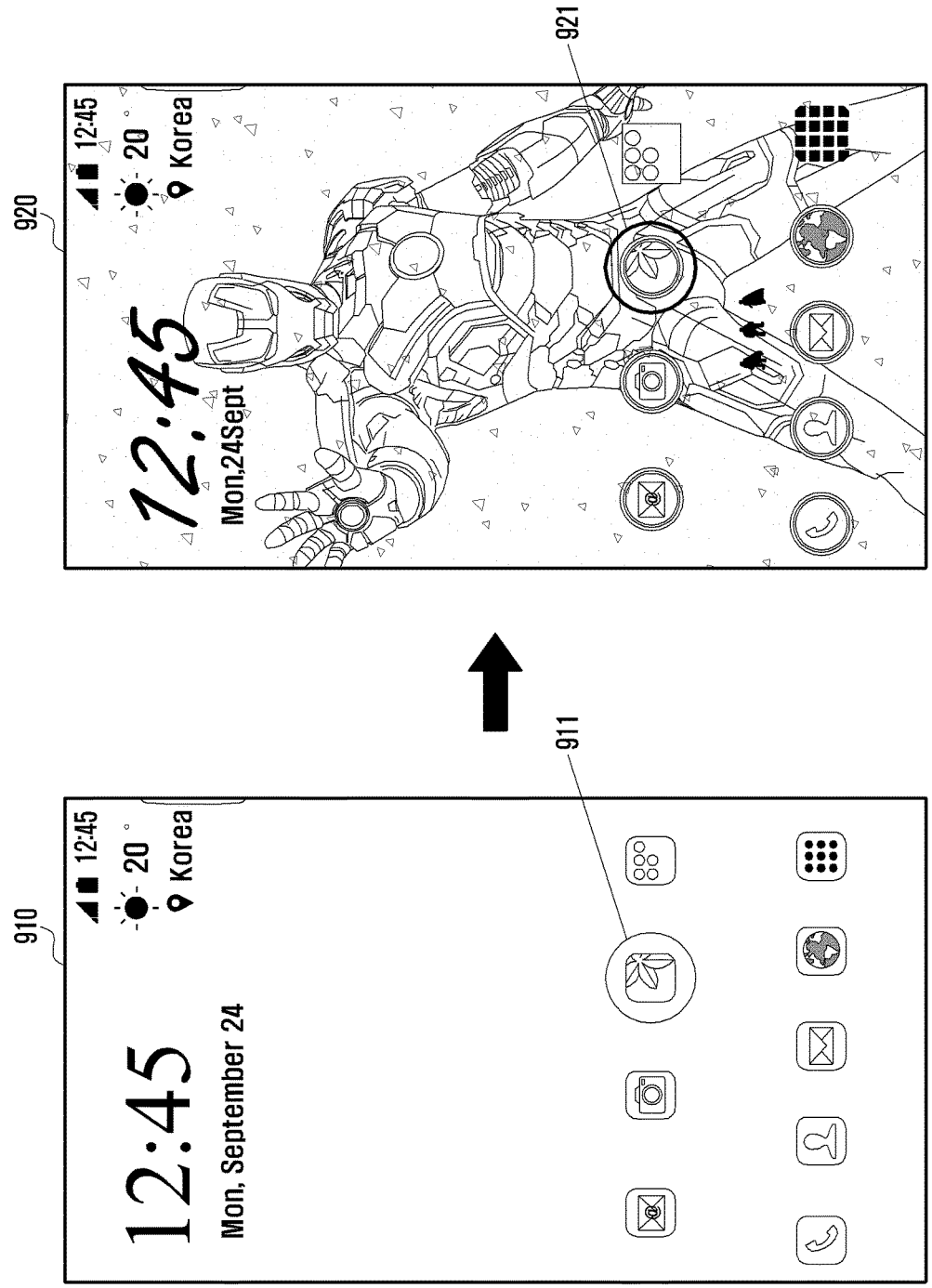
FIGS. 9A to 9C illustrates screens displayed on an electronic device, when a theme package is applied, according to an embodiment of the present disclosure.
Figure 9B:
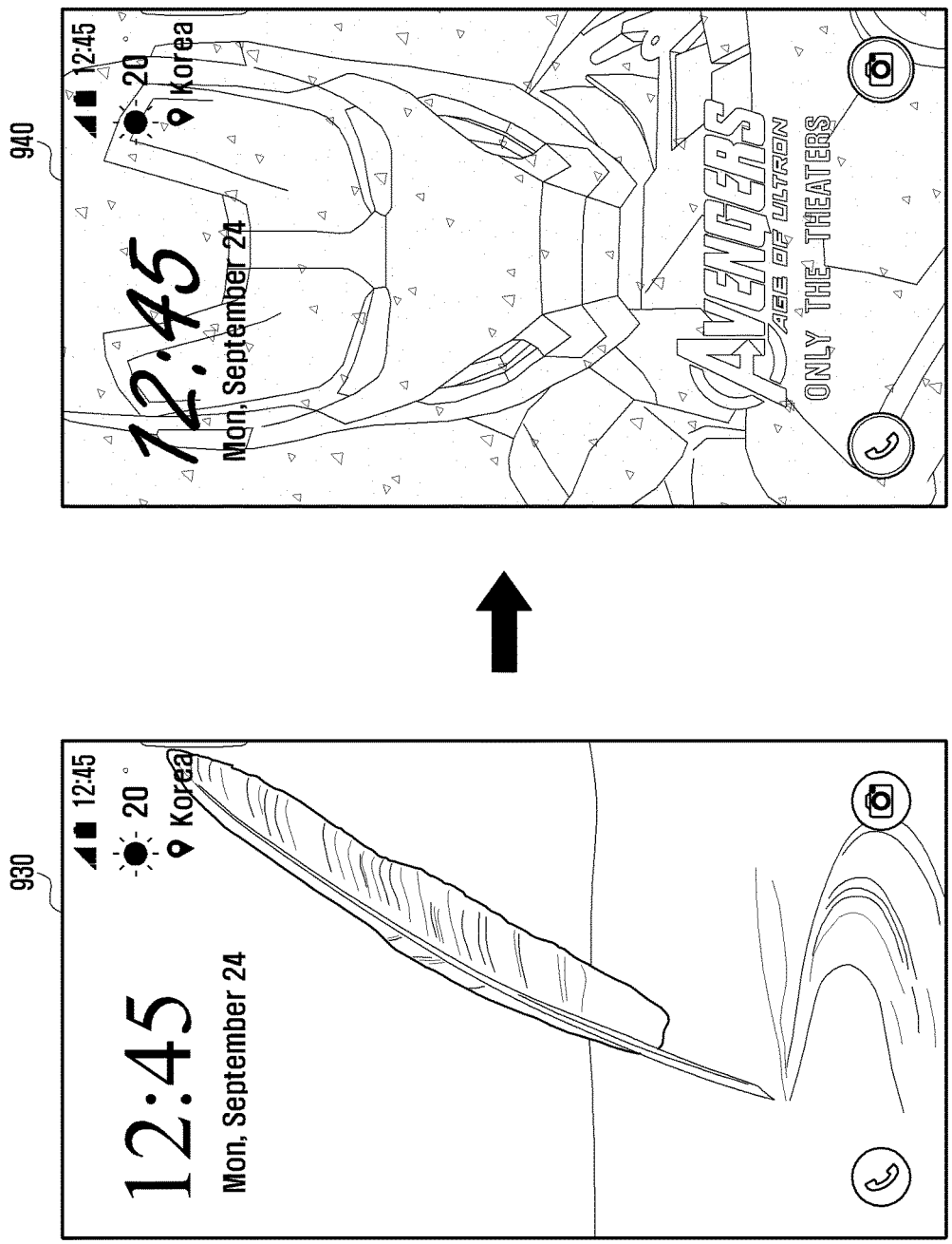
Figure 9C:
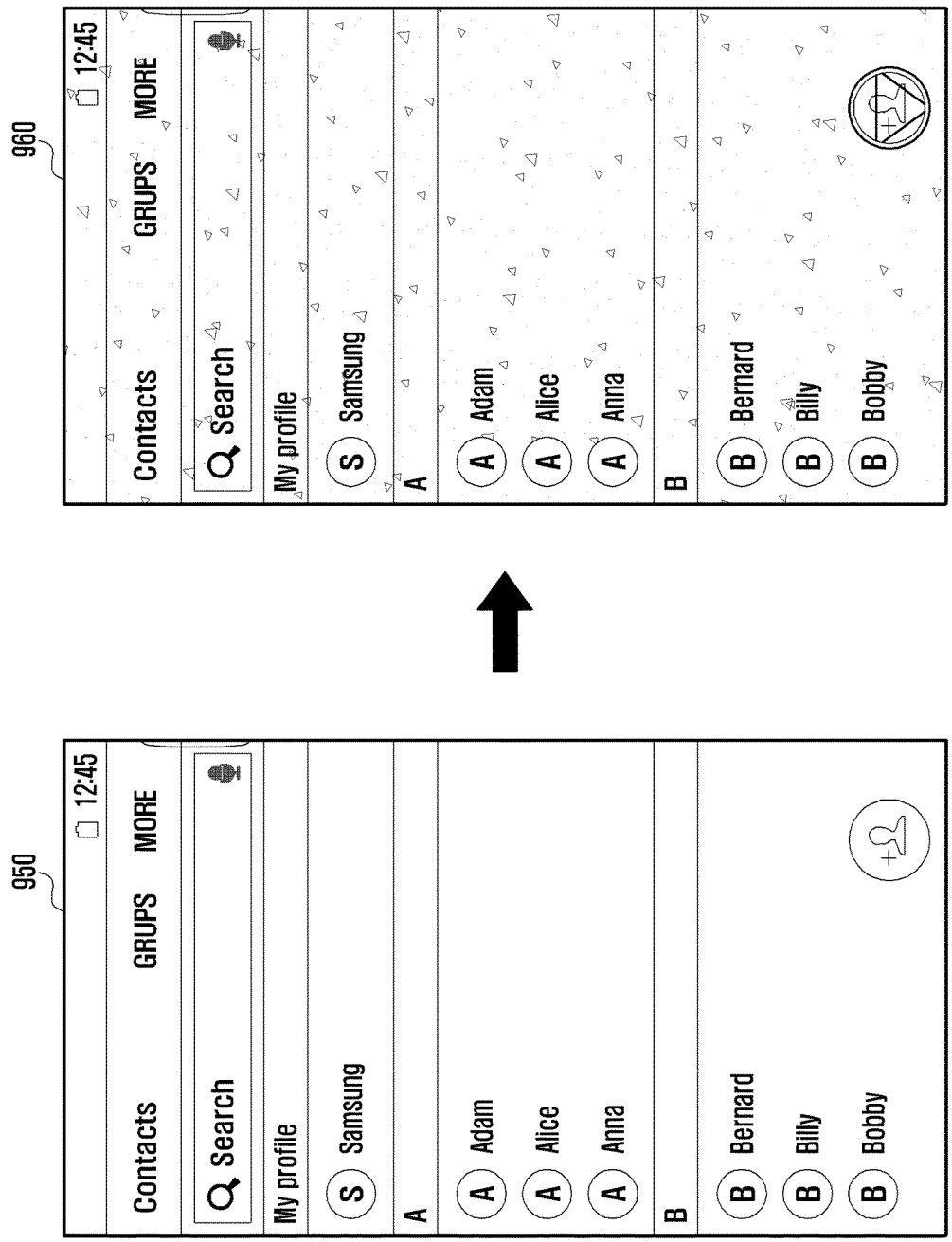

FIGS. 9A to 9C illustrates screens displayed on an electronic device, when a theme package is applied, according to an embodiment of the present disclosure.

Referring to FIG. 9A, home screens 910 and 920 are shown. Specifically, in FIG. 9A, the left screenshot shows a default home screen 910 to which no theme is applied, and the right screenshot shows another home screen 920 to which an "Iron Man" theme is applied. The default home screen 910 may display a background screen, a font, application icons, and function icons, all of which are provided basically. The theme-applied home screen 920 may display a background image having an "Iron Man" character, a font of an "Iron Man" theme concept, application icons reflecting the "Iron Man" theme concept, and function icons reflecting the "Iron Man" theme concept. For example, while a gallery icon 911 displayed on the default home screen 910 may have a simple form, another gallery icon 921 displayed on the theme-applied home screen 920 may have a rim represented with an "Iron Man" feeling. Also, all icons displayed on the theme-applied home screen 920 may be represented with a color suitable for the theme.

Referring to FIG. 9B, lock screens 930 and 940 are shown. Specifically, in FIG. 9B, the left screenshot shows a default lock screen 930 to which no theme is applied, and the right screenshot shows another lock screen 940 to which an "Iron Man" theme is applied. Like the theme-applied home screen shown in FIG. 9A, the theme-applied lock screen 940 may display a background screen, a font, and function icons, all of which reflect the "Iron Man" theme. For example, the theme-applied lock screen 940 may display an "Iron Man" character image as a background screen and also display a "Call" icon and a "Camera" icon both of which reflect the "Iron Man" theme.

Referring to FIG. 9C, contact list screens 950 and 960 are shown. Specifically, in FIG. 9C, the left screenshot shows a default contact list screen 950 to which no theme is applied, and the right screenshot shows another contact list screen 960 to which an "Iron Man" theme is applied. For example, a background screen of the theme-applied contact list screen 960 may reflect a color corresponding to the "Iron Man" theme. Also, an "Add Contact" icon displayed on the theme-applied contact list screen 960 may reflect the "Iron Man" theme.

As shown in FIGS. 9A to 9C, the processor 120 may apply information associated with a specific theme to various screens when a theme package associated with the theme is installed. Further, in order to install the theme package associated with the theme, the processor 120 may classify sub-packages contained in the theme package into normal sub-packages and theme sub-packages. Then, by installing the normal sub-packages and the theme sub-packages through different installation procedures, it is possible to reduce the time required for the package installation. That is, the entire time for the installation of a theme package can be minimized.

At least part of the device (e.g., modules or functions thereof) or method (e.g., operations), according to various embodiments, may be implemented as commands stored, e.g., in the form of the program module 310, in a non-transitory computer-readable storage medium. In case commands are executed by the processor 120, the processor 120 may perform a particular function corresponding to the commands. The non-transitory computer-readable storage medium may be, for example, the memory 130. At least some of the program module 310 may be implemented (e.g., executed) by the processor 120. At least some of the program module 310 may include, for example, a module, a program, a routine, a set of instructions, and/or a process for performing one or more functions.

The non-transitory computer-readable storage medium may include magnetic media such as a hard disk, a floppy disk, and a magnetic tape, optical media such as a compact disc read only memory (CD-ROM) and a digital versatile disc (DVD), magneto-optical media, such as a floptical disk, and hardware devices specially configured to store and perform a program instruction. In addition, the program instructions may include high class language codes, which can be executed in a computer by using an interpreter, as well as machine codes made by a compiler. The aforementioned hardware device may be configured to operate as one or more software modules in order to perform the operation of various embodiments of this disclosure, and vice versa.

A module or programming module, according to various embodiments, may include or exclude at least one of the above-discussed elements or further include any other element. The operations performed by the module, programming module or any other element may be executed sequentially, in parallel, repeatedly, or by a heuristic method. Additionally, some operations may be executed in different orders or omitted, or any other operation may be added.

While the present disclosure has been particularly shown and described with reference to various embodiments, it will be understood by those skilled in the art that various changes in form and details may be made therein without departing from the spirit and scope of the disclosure, which is defined, not by the detailed description and embodiments, but by the appended claims and their equivalents.

What is claimed is:

1. A method for operating an electronic device, the method comprising:
   receiving a theme package file including at least one sub-package and at least one theme sub-package having at least one of a resource and a function for implementing a theme;
   in response to the at least one theme sub-package being selected to be installed, identifying a second installation procedure corresponding to the at least one theme sub-package; and
   installing the at least one theme sub-package by using the identified second installation procedure,
   wherein the second installation procedure corresponding to the at least one theme sub-package excludes at least a part of a first installation procedure corresponding to the at least one sub-package,
   wherein a first installation time corresponding to the second installation procedure is less than a second installation time corresponding to the first installation procedure, and
   wherein the second installation procedure is obtained by removing installation operations irrelevant to the at least one theme sub-package from installation operations contained in the first installation procedure.

2. The method of claim 1, wherein the at least one theme package is identified based on at least one of file names, tags, manifests, and type information of the sub-package.

3. The method of claim 1, wherein the at least one theme sub-package is excluded from a package list to be checked at booting.

4. The method of claim 1, wherein the first installation procedure comprises:
   copying a file associated with the at least one sub-package to a designated place,
   determining application identification information associated with the at least one sub-package,
   creating a directory associated with the at least one sub-package, and
   creating resource connection information between the at least one sub-package and a target application,
   wherein the second installation procedure comprises:
   creating the resource connection information between the at least one theme sub-package and the target application.

5. The method of claim 4, wherein the second installation procedure excludes at least one of operations of copying the file associated with the at least one sub-package to the designated place, determining the application identification information associated with the at least one sub-package, and creating the directory associated with the at least one sub-package.

6. An electronic device comprising:
   a display;
   a communication circuit; and
   a processor that:
   controls the communication circuit to receive a theme package file from an external device, the theme package file including at least one sub-package and at least one theme sub-package having at least one of a resource and a function for implementing a theme,
   in response to the at least one theme sub-package being selected to be installed, identifies a second installation procedure corresponding to the at least one theme sub-package, and
   installs the at least one theme sub-package by using the identified second installation procedure,
   wherein the second installation procedure corresponding to the at least one theme sub-package excludes at least a part of a first installation procedure corresponding to the at least one sub-package,
   wherein a first installation time corresponding to the second installation procedure is less than a second installation time corresponding to the first installation procedure, and
   wherein the second installation procedure is obtained by removing installation operations irrelevant to the at least one theme sub-package from installation operations contained in the first installation procedure.

7. The electronic device of claim 6, wherein the at least one theme package is identified based on at least one of file names, tags, manifests, and type information of the sub-package.

8. The electronic device of claim 6, wherein the processor:
   excludes the at least one theme sub-package from a package list to be checked at booting.

9. The electronic device of claim 6, wherein when the first installation procedure is executed, the processor that:
copies a file associated with the at least one sub-package to a designated place,
determines application identification information associated with the sub-package,
creates a directory associated with the at least one sub-package, and
creates resource connection information between the at least one sub-package and a target application.

10. The electronic device of claim 9, wherein when the second installation procedure is executed, the processor creates the resource connection information between the at least one theme sub-package and the target application.

11. The electronic device of claim 10, wherein when the second installation procedure is executed, the processor excludes at least one of operations of copying the file associated with the at least one sub-package to the designated place, determining the application identification information associated with the at least one sub-package, and creating the directory associated with the at least one sub-package.

12. The electronic device of claim 6, wherein the resource includes information associated with at least one of an image, a symbol, a color, a tone, a font, a typeface, an icon, a background image, a framework, and a sound which are used for the theme.

13. The electronic device of claim 6, wherein the function includes information associated with at least one of an operation definition of an application required for applying the theme, a theme change notification, a location control of a file having to be referred to, a feature update, and a widget control.

14. A non-transitory computer-readable storage medium, having stored thereon, instructions for performing the steps of:
receiving a theme package file including at least one sub-package and at least one theme sub-package having at least one of a resource and a function for implementing a theme;
in response to the at least one theme sub-package being selected to be installed, identifying a second installation procedure corresponding to the at least one theme sub-package; and
installing the at least one theme sub-package by using the identified second installation procedure,
wherein the second installation procedure corresponding to the at least one theme sub-package excludes at least a part of a first installation procedure corresponding to the at least one sub-package,
wherein a first installation time corresponding to the second installation procedure is less than a second installation time corresponding to the first installation procedure,
wherein the second installation procedure is obtained by removing installation operations irrelevant to the at least one theme sub-package from installation operations contained in the first installation procedure.

* * * * *